US012752568B2

(12) United States Patent
Karafotis et al.

(10) Patent No.: US 12,752,568 B2
(45) Date of Patent: Oct. 6, 2026

(54) METALLIC FOIL CARD AND MANUFACTURING THEREOF

(71) Applicant: THALES DIS FRANCE SAS, Meudon (FR)

(72) Inventors: Stéphane Karafotis, St Maximin la Ste Baume (FR); Sébastien Subra, Auriol (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/699,626

(22) PCT Filed: Oct. 14, 2022

(86) PCT No.: PCT/EP2022/078706
§ 371 (c)(1),
(2) Date: Apr. 9, 2024

(87) PCT Pub. No.: WO2023/062214
PCT Pub. Date: Apr. 20, 2023

(65) Prior Publication Data

US 2024/0408910 A1 Dec. 12, 2024

(30) Foreign Application Priority Data

Oct. 15, 2021 (EP) .................................... 21306451

(51) Int. Cl.
*B42D 25/455* (2014.01)
*B42D 25/373* (2014.01)
*B44C 1/14* (2006.01)
*B44C 1/17* (2006.01)
*G06K 19/077* (2006.01)

(52) U.S. Cl.
CPC ......... *B42D 25/373* (2014.10); *B42D 25/455* (2014.10); *B44C 1/145* (2013.01); *B44C 1/1712* (2013.01); *G06K 19/07718* (2013.01)

(58) Field of Classification Search
CPC ......... B44C 1/145; B44C 1/1712; B41M 5/52
See application file for complete search history.

(56) References Cited

U.S. PATENT DOCUMENTS

| | | | | |
|---|---|---|---|---|
| 4,897,533 | A | 1/1990 | Lyszczarz | |
| 2021/0221164 | A1* | 7/2021 | Schlatterbeck .......... | B41M 5/52 |

FOREIGN PATENT DOCUMENTS

| | | | |
|---|---|---|---|
| DE | 102018112652 | A1 * | 11/2019 |
| EP | 1959377 | A1 | 8/2008 |

(Continued)

OTHER PUBLICATIONS

EP-3922475-A1 English Translation (Year: 2021).*

(Continued)

*Primary Examiner* — Kyle R Grabowski

(57) ABSTRACT

Provided is a method of manufacturing a data carrier, in particular a smartcard, comprising steps for providing at least one carrier body, and providing at least one metallic foil. The method further comprises the step of providing at least one transferring element being at least temporarily in connection with the metallic foil. The metallic foil is transferred from the transferring element to the carrier body in a step of transferring. Other embodiments disclosed.

9 Claims, 3 Drawing Sheets

(56) References Cited

FOREIGN PATENT DOCUMENTS

| | | | | | |
|---|---|---|---|---|---|
| EP | 3922475 | A1 | * | 12/2021 | ........... B42D 25/324 |
| JP | H11353442 | A1 | | 12/1999 | |

OTHER PUBLICATIONS

DE-102018112652-A1 English Translation (Year: 2019).*

International Search Report (PCT/ISA/210) and Written Opinion (PCT/ISA/237) mailed on May 17, 2023, by the European Patent Office as the International Searching Authority for current International Application No. PCT/EP2022/078706—[17 pages].

* cited by examiner

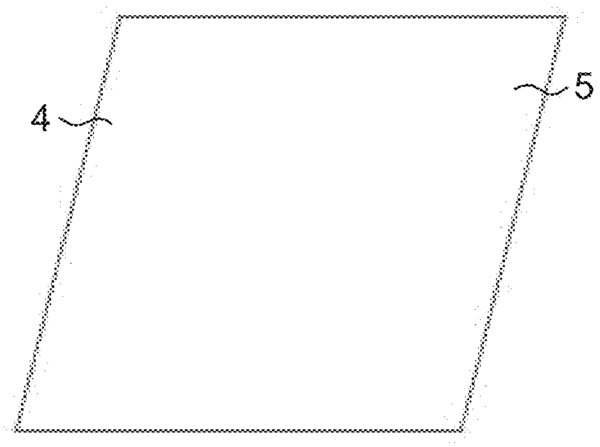
FIG. 1a
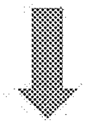
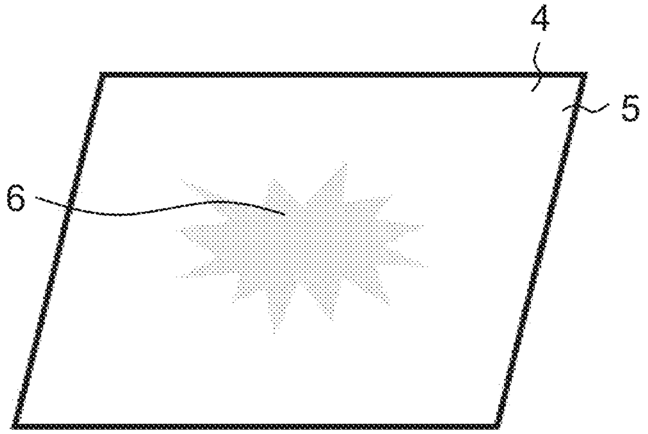
FIG. 1b
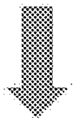

METALLIC FOIL CARD AND MANUFACTURING THEREOF

TECHNICAL FIELD

The present invention relates to a method of manufacturing a data carrier comprising at least one metallic foil according to claim 1 and to a data carrier comprising at least one metallic foil according to claim 13.

BACKGROUND

Data carriers such as smartcards comprising metallic foils are well-known in the art. The metallic foil is applied to these data carriers by vacuum metallization or vapour deposition of metallic compounds. These processes are complex, expensive, and require dedicated tools.

Further disadvantages associated with the data carriers comprising metallic foils are a bad RF performance in the event that the data carrier comprises a contactless electronic RFID module. In fact, the provision of metallic foils on both sides of the data carrier results in a complete loss of the RFID signal and consequently makes any transactions impossible. Consequently, these so-called double side foil cards are not recommended by schemes and in some Northern countries, there are even disclaimers in regards of risk of electric discharge due to ESD.

SUMMARY

It is an object of the present invention to overcome the drawbacks of the state of the art. In particular, it is an object of the present invention to provide a method of manufacturing a data carrier being simple and inexpensive while providing a data carrier that can be used in a reliable manner.

This object is achieved with the method of manufacturing a data carrier according to claim 1. In particular, a method of manufacturing a data carrier, in particular a smartcard, is provided, wherein the method comprises the steps of i) providing at least one carrier body, and ii) providing at least one metallic foil. The method further comprises the step of providing at least one transferring element being at least temporarily in connection with the metallic foil, and wherein the metallic foil is transferred from the transferring element to the carrier body in a step of transferring.

That is to say, the metallic foil is not applied to the carrier body by means of a vacuum metallization or a vapour deposition or the like. Instead, the metallic foil is transferred from a transferring element to the carrier body, which is less cumbersome and cost-effective. Furthermore, and as will be explained in greater detail below, the metallic foil being transferred in this manner comprises one or more, in particular a plurality of microcracks. The presence of these microcracks enables an uninterrupted or undisturbed and thus stable communication between an electronic module being provided in the data carrier and an outside of the data carrier, for instance a transaction terminal.

The transferring element is preferably heated in a step of heating. It is particularly preferred to heat the transferring element to a temperature of at least 100° C. or more and/or to a temperature in the range of 100° to 150° in the step of heating. The step of heating and the step of transferring are preferably performed simultaneously.

The transferring element is preferably pressed onto the carrier body in a step of pressing. Said pressing of the transferring element onto the carrier body is preferably achieved by the provision of at least one pressing element that presses the carrier body against the transferring element in the step of pressing. Additionally or alternatively it is conceivable that at least one further pressing element is provided which presses the transferring element against the carrier body. It is furthermore preferred that the transferring element and the pressing element are arranged on opposing sides of the carrier body. If applicable, the further pressing element and the pressing element are preferably arranged on opposing sides of the carrier body. The step of pressing and the step of heating and/or the step of transferring are preferably performed simultaneously.

The transferring element is preferably rolled about at least one rolling element in a step of rolling. The step of rolling and the step of pressing and/or the step of heating and/or the step of transferring are preferably performed simultaneously.

That is, the transferring element is preferably heated and pressed and rolled while the metallic foil is transferred from the transferring element to the carrier body. Hence, the metallic foil is preferably provided to the carrier body in a process that is known as roll hot stamping. To this end a commercially available hot roll stamping apparatus is used, for instance the apparatus GAMMA AP 105 manufactured by the company GAMMA. The rolling element is preferably a component of said hot roll stamping apparatus. Moreover, the pressing element is preferably a component of said hot roll stamping apparatus as well. In addition, it is preferred to use a cleaning device that cleans the data carrier before the metallic foil is applied to the carrier body. To this end it is preferred to provide the cleaning device before the hot roll stamping apparatus with respect to a movement direction along which the carrier body is moved. Said cleaning device is likewise preferably a commercially available device such as the cleaning station based on ionized air "Web Cleaner" from AMG Solution.

The method preferably further comprises the step of providing at least one movement element being in connection with the carrier body, wherein the movement element is moved along a movement direction while the metallic foil is provided to the carrier body in a step of moving. The movement element in the step of moving is preferably moved at a speed of 1 meter per minute or more, preferably of 5 meter per minute or more, particularly preferably of 10 meter per minute or more.

The step of transferring and/or the step of heating and/or the step of pressing and/or the step of rolling and/or the step of moving are preferably performed simultaneously. That is, it is preferred to transfer the metallic foil from the transferring element while the transferring element is heated and pressed and rolled as well as while the carrier body is moved by the movement element along the movement direction. The rolling element preferably is stationary, i.e. it preferably does not move along a movement direction. It is particularly preferred that the rolling element rotates about an axis of rotation, wherein it rotates in place.

The movement element is preferably a component of the hot roll stamping apparatus mentioned above as well.

Hence, the metallic foil is particularly preferably applied to the carrier body by a hot roll stamping apparatus, wherein the carrier body is arranged on the movement element and moved along the movement direction by the movement element. The movement element preferably corresponds to a conveyor belt or the like.

While the movement element moves the carrier body, the pressing element preferably presses against a bottom surface of the carrier body while the transferring element is pressed by the pressing element and/or the further pressing element against a top surface of the carrier body. It is furthermore preferred that the transferring element is rolled about the rolling element while being heated and while it presses against the top surface of the carrier body and/or while it provides an abutment for the top surface of the carrier body.

At least in an initial state, it is preferred that the metallic foils is arranged on the transferring element. The metallic foil is preferably provided in the form of a layer, i.e. the metallic foil can be seen as a metallic layer. The initial state is a state before the metallic foil is transferred to the carrier body. The transferring element is preferably provided in the form of a layer as well.

It is furthermore preferred that, at least in the initial state, one or more further layers are arranged on the transferring element as well. In fact, it is preferred that the transferring element furthermore comprises at least one adhesive layer. Moreover, it is preferred that the adhesive layer are transferred from the transferring element to the carrier body in the step of transferring as well. Hence, the transferring element can be seen as a release layer, from which layer the other layers are released.

In said initial state it is particularly preferred that the transferring element comprises in this sequence the release layer, the metallic foil, and the adhesive layer. When the metallic layer is transferred from the transferring element to the carrier body, the metallic layer and preferably additionally also the adhesive layer are released from the release layer. The release layer in turn preferably remains on the hot roll stamping apparatus. Hence, in a final state after at least the metallic foil has been transferred to the carrier body, the transferring element preferably consists of or is provided by the release layer only.

The release layer preferably comprises or consists of one or more polymers and/or waxes. The adhesive layer preferably comprises or consists of one or more adhesive polymers and/or is commercially available. As will be explained in greater detail further below, also the metallic foil or metallic layer is preferably commercially available.

It should be noted that whenever explanations are made with regard to the metallic foil being provided on and/or in the carrier body, the adhesive layer could be additionally provided as well. In fact, it is particularly preferred that the metallic foil and the adhesive layer are transferred to the carrier body and/or are arranged on the carrier body as a single piece or unit. Again in other words, it is preferred that the metallic foil and the adhesive layer are transferred simultaneously to the carrier body. Furthermore, the metallic foil and the adhesive layer are preferably arranged congruently on the carrier body.

The method preferably further comprises the step of providing at least one electronic module. The electronic module preferably is a contactless electronic module such as an RFID module. It is furthermore preferred that the electronic module is embedded in the carrier body, for instance in a cavity that has been milled into the carrier body as it is commonly known in the state of the art.

The carrier body preferably comprises a top surface and/or a bottom surface. The metallic foil is preferably provided directly or indirectly on the top surface of the carrier body and/or on the bottom surface of the carrier body. Additionally or alternatively, the metallic foil can be provided within the carrier body.

In the event that the metallic foil is provided on the top surface and/or the bottom surface of the carrier body, it is preferred to provide the metallic foil indirectly on said surfaces. In fact, it is preferred that the adhesive layer is arranged between the metallic foil and the top surface and the bottom surface, respectively.

In the event that the metallic foil is provided within the carrier body, it is conceivable that only the metallic foil is provided. However, it is likewise conceivable that also in this case the metallic foil and additionally also the adhesive layer are arranged within the carrier body.

The data carrier preferably comprises at least two metallic foils, and wherein the electronic module is arranged at least partially between said two metallic foils. That is, it is preferred that the electronic module is sandwiched between the metallic foils. Again in other words, when seen along the extension direction, it is preferred that the electronic module is arranged after a first metallic foil, and that a second metallic foil is arranged after the electronic module. Since the metallic foil is preferably transferred together with the adhesive layer and/or constitutes a single piece or unit, it is thus preferred that the electronic module is arranged after a first piece or first unit formed of a first metallic foil and a first adhesive layer, and that a second piece or unit formed of a second adhesive layer and a second metallic foil is arranged after the electronic module with respect to the extension direction.

It is furthermore preferred that the adhesive layers are facing towards the carrier body and that the metallic foils are facing away from the carrier body.

The metallic foil is preferably electrically non-conductive or essentially electrically non-conductive. The metallic foil preferably comprises an electrical conductivity being less than 0.5 μC (micro Coulomb), preferably being less than 0.2 μC (micro Coulomb). The metallic foil preferably comprises one or more, preferably a plurality of microcracks. The microcracks preferably are in the range of 1 micrometer to 900 micrometer. The microcracks can be seen as perforations or holes in the metallic foil. Said microcracks or perforations or holes preferably extend at least partially, preferably entirely through the metallic foil.

The microcracks preferably reduce or even eliminate an electrical conductivity of the metallic foil. As a consequence and as already mentioned initially, the presence of these microcracks enables an uninterrupted or undisturbed and thus stable communication between an electronic module being provided in the data carrier and an outside of the data carrier, for instance a transaction terminal.

Furthermore, the microcracks are preferably generated in the metallic foil upon the transferring of the metallic foil from the transferring element to the carrier body.

The metallic foil preferably comprises or consists of one or more metals and/or one or more metal-containing compounds such as organometallic compounds. The metallic foil preferably comprises or consists of aluminium and/or of one or more aluminium-containing coordination.

The carrier body preferably comprises or consists of at least one polymer, preferably a thermoplastic polymer and/or a transparent polymer, the at least one polymer particularly preferably being polyvinyl chloride and/or polyethylene terephthalate and/or recycled polyvinyl chloride (rPVC) and/or recycled polyethylene terephthalate (rPET) and/or polylactic acid (PLA). Additionally or alternatively, the carrier body preferably comprises or consists of one or more layers.

To this end it is preferred that the carrier body comprises or consists of one or more layers of one or more polymers. In fact, the carrier body preferably corresponds to a multilayer structure. To this end it is particularly preferred that the carrier body corresponds to a so-called card body as it is commonly known in the card industries. The layers of the carrier body are preferably connected to one another by a lamination process as it is known in the art as well. Furthermore, the carrier body can comprise layers of bio sourced and/or recycled materials like rPVC, PLA, rPET.

In the event that the data carrier comprises a contactless electronic module such as the RFID module, it is preferred that the data carrier comprises further components as they are known in the art. For instance, it is preferred that the data carrier, in particular the carrier body, comprises at least one antenna that is configured to communicate with the electronic module.

The method preferably further comprises the step of providing at least one varnish. The varnish is preferably provided before the metallic foil is provided with respect to time. Additionally or alternatively the metallic foil is preferably arranged at least partially above and/or below the varnish with respect to the extension direction. It is particularly preferred that the metallic foil and the varnish are arranged congruently with one another and with respect to the extension direction.

In other words, the metallic foil and the varnish can be arranged at least partially overlapping, more preferably entirely overlapping, one another with respect to the extension direction. For instance, if the varnish is arranged in two regions of a surface of the data carrier, for example in two regions of a surface of a transparent polymer layer as mentioned earlier, it is preferred that the metallic foil (possibly together with the adhesive layer) is provided on the surfaces of said two regions of varnish.

The varnish preferably is provided as a continuous layer. It is however likewise preferred that the varnish is provided as an intermittent layer. Additionally or alternatively, the varnish can be provided on a full surface of the data carrier, preferably on a full surface of the carrier body. Alternatively, the varnish can be provided in one or more regions of a surface of the data carrier, preferably in one or more regions of a surface of the carrier body.

The data carrier preferably defines a top side and an opposing bottom side. When seen along the extension direction extending from the top side of the data carrier towards the bottom side of the data carrier the metallic foil is preferably provided before the varnish. In other words, if the extension direction is defined as a vertical direction, the metallic foil is preferably arranged above the varnish with respect to the vertical direction.

The varnish and the metallic foil can be arranged in immediate contact with one another. In other words, it is conceivable that no further component is arranged between the metallic foil and the varnish. To this end it is particularly preferred that the metallic foil is arranged on a surface of the varnish. However, it is likewise conceivable that the adhesive layer is arranged between the metallic foil and the varnish. Also in this case it is preferred that the adhesive layer is arranged on the surface of the varnish.

The varnish preferably is a UV-curable varnish and/or a solvent-based varnish. The varnish is preferably a commercially available varnish.

The varnish is preferably provided by printing. Various printing technologies known in the art are conceivable. For example, the varnish could be silkscreen printed, flexo printed, inkjet printed, applied by gravure, electrography, offset printing, etc.

To this end it is preferred that the varnish is printed in a first step. Thereafter, it is preferred that the varnish is cured and/or dried. Thereafter, it is preferred that the metallic foil possibly together with the adhesive layer is transferred onto the varnish.

The varnish is preferably provided as a layer, a thickness of the layer of varnish preferably is in the range of 1 micrometer to 100 micrometer, more preferably in the range of 1 micrometer to 50 micrometer, and particularly preferably in the range of 1 micrometer to 40 micrometer. Additionally or alternatively a thickness of the layer of varnish preferably is 100 micrometer or less, in particular 40 micrometer or less, for instance 10 micrometer or less such as 5 micrometer or less.

A thickness of the metallic foil being provided on and/or in the carrier body preferably is 5 micrometer or less, more preferably 1 micrometer or less.

The metallic foil can be continuous or intermittent. Additionally or alternatively, the metallic foil can be provided on a full surface of the data carrier, preferably on a full surface of the varnish, or only in one or more regions of a surface of the data carrier, preferably in one or more regions of a surface of the varnish. In other words, the metallic foil can be applied regionally and/or selectively.

The metallic foil is preferably provided in the shape of at least one alphanumeric character and/or of at least one image.

Non-exhaustive examples of an image are a portrait or photograph or biometric information such as a fingerprint e.g. of the holder of the data carrier, an outline of a country, a state coat of arms, a state flag, a signature panel, geometric objects such as lines, circles, a graphical representation of an encoded information such as a bar code or a QR code, etc. Non-exhaustive examples of alphanumeric characters are a date of birth, a name, a social security number e.g. of the holder of the data carrier, an expiry date, etc. That is, the metallic foil can be provided as a personalization element. The personalization element preferably serves the purpose of attributing personalized information such as personal data of the holder of the data carrier to the data carrier.

The method preferably further comprises the step of providing at least one coating element on at least part of a surface of the metallic foil.

The coating element is preferably provided in the form of a layer. Additionally or alternatively the coating element preferably comprises or consists of one or more polymers being configured to protect the metallic foil and/or is commercially available. A conceivable coating element is the commercially available coating "Apollo S9258", for instance.

The coating element is preferably provided by printing. Various printing technologies known in the art are conceivable. For example, the coating element could be silkscreen printed, flexo printed, inkjet printed, applied by gravure, electrography, offset printing, etc.

To this end it is preferred that the varnish is printed onto the carrier body in a first step. Thereafter, it is preferred that the varnish is cured and/or dried. Thereafter, it is preferred that the metallic foil possibly together with the adhesive layer is transferred onto the varnish. Thereafter, it is preferred to print the coating element onto the metallic foil. Hence, the coating element and the metallic foil are preferably arranged at least partially, preferably entirely overlapping or congruently with respect to one another and with respect to the extension direction.

The method preferably further comprises the step of providing at least one security element. The security element is preferably provided at least partially on the coating element. The security element preferably is at least one alphanumeric character and/or at least one image, for instance an alphanumeric character or an image as mentioned above. The security element particularly preferably corresponds to a so-called artwork.

In a further aspect a data carrier, in particular a smartcard, is provided. The data carrier extends along an extension direction and comprises at least one carrier body and at least one metallic foil. The metallic foil comprises one or more, preferably a plurality of microcracks. Additionally or alternatively, the metallic foil is electrically non-conductive or essentially electrically non-conductive.

The data carrier preferably corresponds to a data carrier as described above. Hence, any explanations made herein regarding the data carrier being produced according to the method preferably likewise apply to the data carrier per se and vice versa.

For instance, the metallic foil preferably comprises an electrical conductivity being less than 0.5 μC, preferably being less than 0.2 μC. Furthermore, a length of the microcracks preferably is in the range of 1 micrometer to 900 micrometer.

Moreover, the metallic foil preferably comprises or consists of one or more metals and/or one or more metal-containing compounds such as organometallic compounds.

In addition, the data carrier preferably further comprises at least one electronic module, preferably a contactless electronic module and particularly preferably an RFID module. Said electronic module is preferably embedded in the carrier body, in particular within a cavity being provided in the carrier body.

The carrier body preferably comprises or consists of at least one polymer, preferably a thermoplastic polymer and/or a transparent polymer as mentioned above. In particular, the carrier body preferably is a card body as it is known in the card industry.

The carrier body preferably comprises a top surface and/or a bottom surface. A varnish is preferably provided in one or more regions of the top surface and/or the bottom surface or on the full top surface and/or the full bottom surface of the carrier body. The metallic foil is preferably provided in one or more regions of the top surface and/or the bottom surface of the carrier body, in particular on the varnish being provided on the carrier body. Particularly preferred is an attachment of the metallic foil(s) via the adhesive layer(s). Likewise conceivable is an arrangement of one or more metallic foils within the carrier body. Moreover, one or more coating elements are preferably provided at least partially on the surface of the metallic foil(s).

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1*a* shows a top view on a surface of a data carrier in an unprocessed state;

FIG. 1*b* shows a top view on the surface of a data carrier according to FIG. 1*a*, wherein a varnish has been applied onto the surface;

DETAILED DESCRIPTION

Figure 1C:
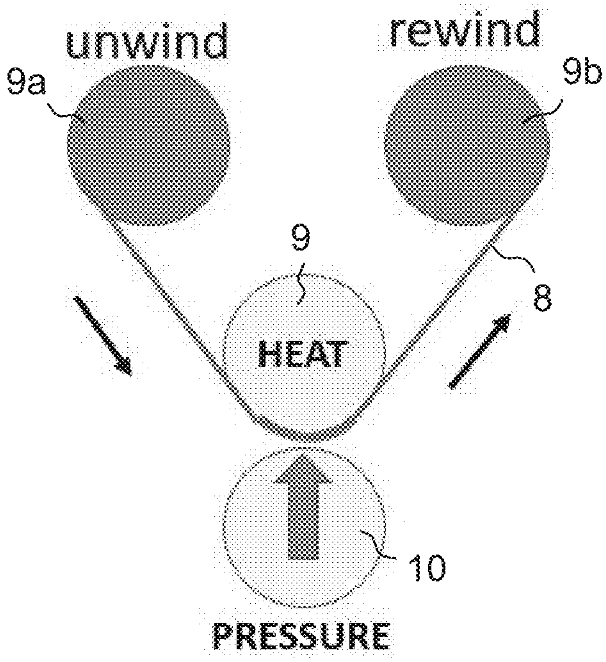
FIG. 1*c* shows a schematic view of a hot roll stamping apparatus comprising a transferring element for transferring a metallic foil onto the data carrier, a rolling element and a pressing element.

Aspects of the data carrier 1 according to the invention and its method of manufacturing are now described in greater detail with respect to the figures.

In essence, the present invention is based on the insight that the provision of metallic foils 2 on data carriers 1 comprising electronic modules such as RFID electronic modules by a hot roll stamping process produces data carriers 1 whose signals can be transmitted from the electronic module towards the outside in an uninterrupted or undisturbed manner. In other words, and in contrast to the data carriers known in the prior art, the metallic foils 2 according to the invention do not disturb or block the signals emitted from the electronic modules nor disturb or block signals being transmitted from an external device to the electronic module being provided in the data carrier 1. This uninterrupted or undisturbed signal transmission is allowed by the presence of microcracks 3, i.e. holes or perforations, in the metallic foil 2 of the data carrier 1, wherein these microcracks 3 are generated during the manufacturing of the data carrier 1, in particular during the transferring of the metallic foil 2 from a hot roll stamping apparatus to the data carrier 1.

In order to produce the data carrier 1 according to the invention, a carrier body 4 is provided, see FIG. 1*a*. The data carrier 1 comprises here several layers of transparent polymers that are laminated together so as to form a so-called card body. Said carrier body 4 comprises a top surface 5 and an opposing bottom surface, wherein these surfaces correspond to the surfaces of the uppermost and lowermost layer of the transparent polymers, respectively. In a first step, a varnish 6 is applied, in particular printed to the top surface 5 of the carrier body 4, see FIG. 1*b*. Here, the varnish 6 is provided in the shape of an image, namely of a square, which is applied to only a part of the top surface 5, i.e. only in a region of the top surface 5 but not on the full top surface 5 of the carrier body 4. The varnish 6 furthermore corresponds to a UV curable varnish that is cured after its application.

Figure 1D:
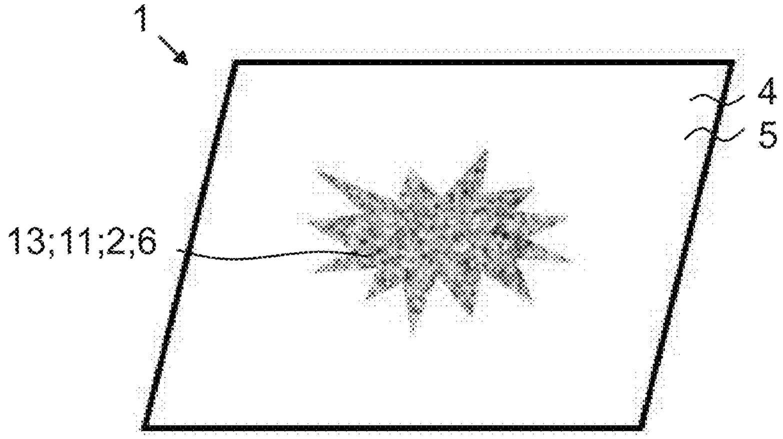
FIG. 1*d* shows a top view on the surface of the data carrier according to FIG. 1*b*, wherein a metallic foil has been applied onto the varnish.

Once that the varnish 6 has been applied and cured, the metallic foil 2 can be applied. To this end the carrier body 4 is moved along a hot roll stamping apparatus 7 by means of a moving element such as a conveyor (not shown). During this movement the carrier body 4 passes by a transferring element 8 which initially comprises the metallic foil 2 and which transfers the metallic foil 2 to the carrier body 4, in particular to the varnish 6 being arranged on the carrier body 4, see FIGS. 1*c* and 1*d*. As follows from FIG. 1*c*, the transferring element 8 has the form of a layer that is guided about three rolling elements 9, 9*a*, 9*b*. The rolling elements 9, 9*a*, 9*b* in each case rotate about an axis of rotation, whereby the rotation of the rolling elements 9, 9*a*, 9*b* rolls the transferring element 8 and thereby also results in a movement of the transferring element 8.

One of the rolling elements 9, here the middle one, is arranged lower than the other two rolling elements 9*a*, 9*b* with respect to a vertical direction V and is furthermore arranged near a pressing element 10. When the carrier body 4 passes between said middle rolling element 9 and the pressing element 10, the pressing element 10 exerts a pressing force onto the carrier body 4, in particular its bottom surface, and against the middle rolling element 9 and/or the middle rolling element 9 exerts a pressing force onto the carrier body 4, in particular its top surface 5, and against the pressing element. As a consequence, the transferring element 8 is brought into contact, in particular pressed onto the carrier body 4 at least in the region of the middle rolling element 9 and the pressing element 10. During these steps of rolling and pressing, the metallic foil 2 being arranged on the transferring element 8 is transferred from the transferring element 8 onto the carrier body 4. It is furthermore preferred that the transferring element 8 is also heated during these steps of rolling and pressing, whereby the transfer of the metallic foil 2 to the carrier body 4 is facilitated. As becomes apparent from FIG. 1*d*, the metallic foil 2 is applied onto the carrier body 4 in the region of the varnish 6. In particular, the metallic foil 2 is applied so as to be congruent with the varnish 6. Consequently, the metallic foil 2 has the shape of a square as well. In other words, the metallic foil 2 is arranged only in a part of the carrier body 4 but not along a full surface of the carrier body 4. After the metallic foil 2 has been applied to the carrier body 4, a coating element 11 that coats and protects the metallic foil 2 is printed onto a top surface 12 of the metallic foil 2.

Figure 2:
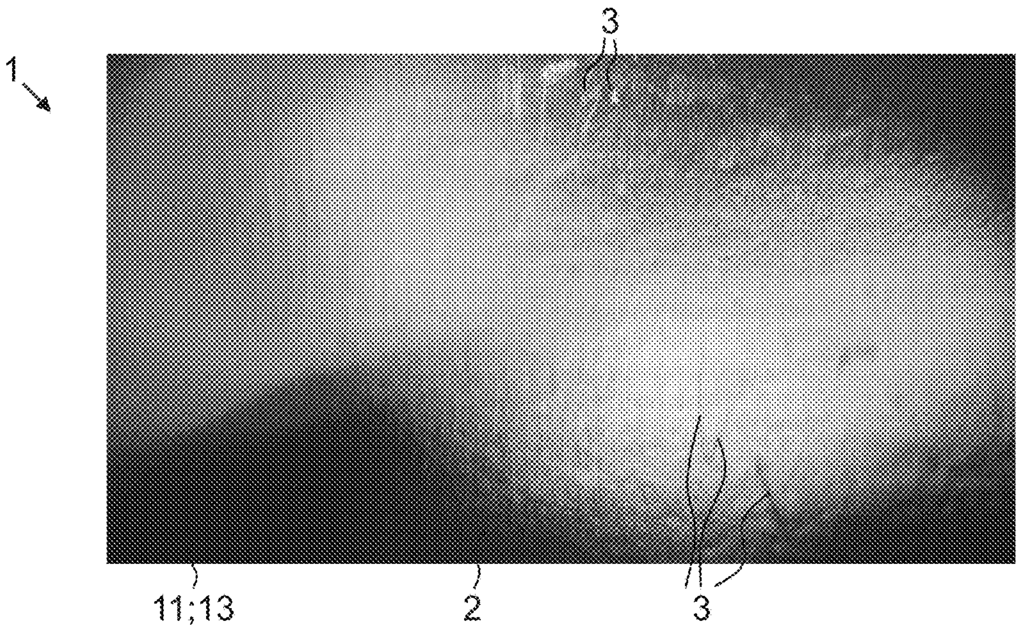
FIG. 2 shows a magnified photograph of a metallic foil of a data carrier according to the invention.
Figure 3:
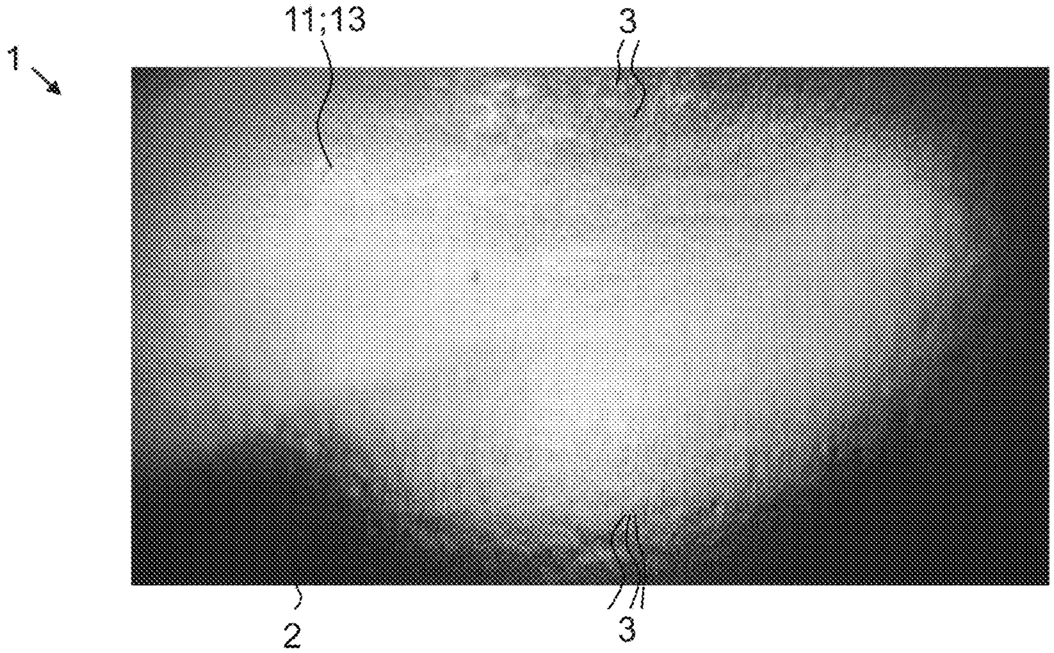
FIG. 3 shows another magnified photograph of a metallic foil of a data carrier according to the invention.

FIGS. 2 and 3 depict photographs of a data carrier 1 being produced by the method according to the invention. In these figures, the plurality of microcracks 3 being generated in the metallic foil 2 is readily visible. The uppermost element or layer, which is here the coating element 11, constitutes a top side 13 of the data carrier 1. In the event that a data carrier comprising double side metallic foils, i.e. metallic foils being provided on both sides of the data carrier, those microcracks allow signals such as RFID signal to be transmitted towards an outside of the data carrier and make transactions or the like possible.

LIST OF REFERENCE SIGNS

| | |
|---|---|
| 1 | data carrier |
| 2 | metallic foil |
| 3 | microcrack |
| 4 | carrier body |
| 5 | top surface |
| 6 | varnish |
| 7 | hot roll stamping apparatus |
| 8 | transferring element |
| 9, 9a, . . . | rolling element |
| 10 | pressing element |
| 11 | coating element |
| 12 | top surface |
| 13 | top side |

The invention claimed is:

1. A method of manufacturing a data carrier (1), suitable for use as a smartcard, comprising the steps of:

Providing at least one carrier body (4);

Providing at least one metallic foil (2);

Providing at least one transferring element (8) temporarily in connection with the metallic foil (2), wherein the metallic foil (2) is transferred from the transferring element (8) to the carrier body (4) in a step of transferring, and the metallic foil (2) comprises one or more microcracks (3), wherein said step of transferring generates the microcracks (3) in the range of 1 micrometer to 900 micrometers as a result of the transferring element (8) being heated to a temperature in the range of 100° to 150°; and Providing at least one movement element in connection with the carrier body (4), wherein the movement element is moved along a movement direction while the metallic foil (2) is provided to the carrier body (4) in a step of moving, wherein the transferring element (8) is rolled about at least one rolling element (9) in a step of rolling, wherein the transferring element (8) is pressed onto the carrier body (4) in a step of pressing, wherein the metallic foil (2) is electrically non-conductive or essentially electrically non-conductive, and/or wherein the metallic foil (2) comprises an electrical conductivity that is less than 0.5 μS/m, wherein the thickness of the metallic foil (2) is 5 micrometer or less, wherein the metallic foil (2) comprises (i) one or more metals and/or (ii) one or more metal-containing compounds including organometallic compounds, and wherein the metallic foil (2) comprises or consists of aluminium and/or of one or more aluminium-containing coordination complexes, and wherein the step of rolling, the step of pressing, the step of heating and the step of transferring are performed simultaneously.

2. The method according to claim 1, wherein the movement element in the step of moving is between a speed of 1 meter per minute or more 10 meters per minute.

3. The method according to claim 1, further comprising the step of providing at least one electronic module, wherein the electronic module is a contactless electronic module including an RFID module, and/or wherein the electronic module is embedded in the carrier body (4).

4. The method according to claim 1, wherein the carrier body (4) comprises a top surface (5) and/or a bottom surface, the metallic foil (2) is provided directly or indirectly on the top surface (5) of the carrier body (4) and/or on the bottom surface of the carrier body (4), and/or wherein the metallic foil (2) is provided within the carrier body (4).

5. The method according to claim 1, wherein the carrier body (4) comprises or consists of at least one polymer, preferably a thermoplastic polymer and/or a transparent polymer, the at least one polymer particularly is polyvinyl chloride and/or polyethylene terephthalate and/or recycled polyvinyl chloride and/or recycled polyethylene terephthalate and/or polylactic acid, and/or wherein the carrier body (4) comprises or consists of one or more layers.

6. The method according to claim 1, further comprising the step of providing at least one varnish (6), wherein the varnish (6) is provided before the metallic foil (2) is provided with respect to time, and/or wherein the metallic foil (2) is at least partially and/or congruently arranged above and/or below the varnish (6) with respect to an extension direction, and/or wherein the varnish (6) is provided as a continuous layer or an intermittent layer, and/or wherein the varnish (6) is provided on a full surface of the data carrier (1), or in one or more regions of a surface of the data carrier (1).

7. The method according to claim 1, wherein the metallic foil (2) is continuous layer or intermittent, and/or wherein the metallic foil (2) is provided on a full surface of the data carrier (1), or in one or more regions of a surface of the data carrier (1).

8. The method according to claim 1, wherein the metallic foil (2) is provided in the shape of at least one alphanumeric character and/or of at least one image.

9. The method according to claim 1, further comprising the step of providing at least one coating element (11) on at least part of a surface (12) of the metallic foil (2), and/or further comprising the step of providing at least one security element.

* * * * *